(12) United States Patent
Laakso et al.

(10) Patent No.: US 6,603,773 B2
(45) Date of Patent: Aug. 5, 2003

(54) METHOD AND SYSTEM FOR CONTROLLING THE TRANSMISSION POWER OF CERTAIN PARTS OF A RADIO TRANSMISSION

(75) Inventors: Janne Laakso, Helsinki (FI); Oscar Salonaho, Helsinki (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/287,844

(22) Filed: Apr. 7, 1999

(65) Prior Publication Data
US 2003/0099209 A1 May 29, 2003

(30) Foreign Application Priority Data
Apr. 8, 1998 (FI) .................................................. 980809
May 28, 1998 (FI) .................................................. 981194

(51) Int. Cl.⁷ .............................................. H04B 7/216
(52) U.S. Cl. ..................... 370/441; 370/320; 370/342; 375/130; 455/69; 455/522
(58) Field of Search ................................ 370/320, 332, 370/333, 335, 342, 441, 503, 506, 508; 375/295, 296, 130; 455/134, 38.3, 522, 68, 69

(56) References Cited

U.S. PATENT DOCUMENTS

| 5,285,470 A | * | 2/1994 | Schreiber ........................ 375/1 |
| 5,465,399 A | | 11/1995 | Oberholtzer et al. .......... 455/69 |
| 5,570,353 A | | 10/1996 | Keskitalo et al. ............. 370/18 |
| 5,722,051 A | * | 2/1998 | Agrawal et al. .............. 455/69 |
| 5,844,884 A | | 12/1998 | Szlenski ...................... 370/149 |
| 6,173,162 B1 | * | 1/2001 | Dahlman et al. ............. 455/69 |
| 6,298,095 B1 | * | 10/2001 | Kronestedt et al. ......... 375/295 |

FOREIGN PATENT DOCUMENTS

| WO | WO 92/16059 | 9/1992 |
| WO | WO 92/33313 | 12/1995 |
| WO | WO 96/31009 | 10/1996 |
| WO | WO 97/00568 | 1/1997 |
| WO | WO 97/02665 | 1/1997 |
| WO | WO 98/58461 | 12/1998 |

* cited by examiner

Primary Examiner—Alpus H. Hsu
Assistant Examiner—Thien D Tran
(74) Attorney, Agent, or Firm—Perman & Green, LLP

(57) ABSTRACT

A data transmission system comprises a first device and a second device and a duplex data transmission connection therebetween. The first device sends to the second device user data on a data channel and control information on a control channel. The transmission is arranged in frames that comprise a user data field corresponding to a data channel and at least a first and a second control information field corresponding together to a control channel. In order to realise the control of the transmission power, there is determined a first transmission power level, a second transmission power level and a third transmission power level. From the second device to the first device there is transmitted a frame by applying said first transmission power level to the transmission of the user data field, said second transmission power level to the transmission of the first control information field and said third transmission power level to the transmission of the second control information field.

25 Claims, 8 Drawing Sheets

METHOD AND SYSTEM FOR CONTROLLING THE TRANSMISSION POWER OF CERTAIN PARTS OF A RADIO TRANSMISSION

TECHNOLOGICAL FIELD

In general, the invention relates to optimising the use of a radio interface in a radio system. In particular, the invention relates to the controlling of transmission power with the aim of utilizing the radio interface in an efficient way. Here the term radio system refers particularly to a cellular radio system where the mobile stations can communicate with various base stations.

BACKGROUND OF THE INVENTION

A cellular radio system has a given amount of radio resources at its disposal. These resources can be described in a coordinate system where the coordinates are frequency, time and location, among others. In other words, in each area, there are certain radio frequencies which are available for a certain period of time. In order to maximise the data transmission capacity in the system and to minimise the power consumption of portable terminals, it is extremely important that the radio resources are utilised in an optimal fashion.

In the CDMA (Code Division Multiple Access) system, where there are several simultaneous radio connections at the same frequency, separated by means of code division, the transmission power is an important factor when optimising the use of radio resources. Particularly important the choice of transmission power is in a so-called macrodiversity connection, i.e. in a situation where in between the mobile station and the network, essentially identical data is transmitted through at least two different base stations. In a correctly arranged macrodiversity connection, the transmission power can be kept so low that the interference caused for other simultaneous connections remains lower than in a case where the connection between a mobile station and the network is arranged via one base station only. A poorly arranged macrodiversity connection may multiply the interference and remarkably reduce the total capacity of the system. The present patent application deals with both macrodiversity connections and conventional connections passing through one base station only.

In a prior art CDMA system, there is often applied so-called two-level power control. An outer control loop, i.e. so-called quality loop, tries to find a suitable target level for the SIR (Signal to Interference Ratio), the BER (Bit Error Ratio) and/or the FER (Frame Error Ratio) of the connection, and/or for some other factor describing the quality of the connection in question. An inner control loop attempts to adjust the transmission power so that the latest target level(s) reported by the outer control loop should be achieved. In order to compensate fast fade-outs and the so-called near-far phenomenon, the inner control loop operates very rapidly, even thousands of times per second. A typical rate of operation for the inner control loop is 1600 times per second. This type of control loop functions so that a receiving device investigates whether the SIR value or some other factor describing the connection quality surpasses the target level or falls under it, and gives feedback to that effect to the transmitting device. In the simplest form, said feedback is only a command to increase or reduce transmission power, in which case it can be expressed in one bit: for instance the bit value zero is interpreted as a command to reduce transmission power, and the bit value one is interpreted as a command to increase transmission power. A given step, for example 1 dB, for increasing or reducing transmission power, can be agreed on in advance.

Let us first observe uplink data transmission in a macrodiversity connection, where the mobile station transmits and the base stations receive. Each base station measures, for its own part, a SIR value or the like, compares it with the target level and sends a power control command as feedback to the mobile station. The mobile station surveys the received power control commands and applies an algorithm in order to decide whether it should reduce or increase its transmission power. A simple algorithm functions so that the mobile station increases its transmission power, if it receives from all base stations a command for increasing transmission power, and reduces its transmission power, if it receives a command to that effect from even one base station. Other algorithms can be, and are, used.

In downlink data transmission, the mobile station compares the measured SIR value or the like with the target level and sends, on the basis of the result obtained in this comparison, a power control command which is received by all base stations operating in said macrodiversity connection.

In addition to power control commands, also other so-called control information is transmitted in between the mobile stations and the base stations. Power control commands and other control information differ from user data or the actual data to be transmitted in that their contents are not meant for the information of the user, but they are used to control factors linked with the use and functionality of the connection. In addition to power control commands, another example of control information are the RI (Rate Information) bits included in each frame to be transmitted over each radio connection and used for sending information from the transmitting to the receiving device about the data rate related to the frame in question. A third example of control information are the pilot bits used in channel estimation. Such parts of the frame where control information is transmitted can be called control fields. There can be set various requirements for each control field as to how reliably the control information contained therein must be correctly understood in the receiver.

In a prior art arrangement, a problem results in that data transmission in between the mobile station and the base stations is not faultless, in which case the receiving device can misinterpret the control information sent by the transmitting device. If for instance the power control command is one (possibly repetition encoded) bit, its value may change to the opposite owing to interference occurring in the radio connection, in which case the device which should have its transmission power adjusted misinterprets the command for increasing the transmission power and reduces its transmission power, or vice versa. In general, it can be assumed that the probability to misinterpret the received control information is a decreasing function of the channel quality. The channel quality is described for instance by the SIR value.

SUMMARY OF THE INVENTION

The object of the present invention is to introduce a method and a system whereby the problems related to the reception of control information can be reduced both in a macrodiversity connection and in a connection between one mobile station and one base station. Another object of the invention is that the implementation of the methods and arrangements according to the invention does not require an unreasonable amount of signalling in between the fixed network facilities or in between base stations and mobile stations. Yet another object of the invention is that radio resources can be efficiently utilised thereby.

These objects of the invention are achieved by providing the base stations and/or mobile stations with a possibility to transmit the information belonging to the control fields (for example pilot field, power control field and RI field bits) at a different power than the actual data to be transmitted. Each control field may have its own transmission power, which is defined either as an absolute power value or as a power difference between it and some other field. In addition, there must be created a suitable, versatile power control system, which controls the transmission power of the data associated with the control channel. Said data associated with the control channel here refers particularly to the power control commands related to the control of the inner loop, but also other data associated with the physical arrangement of the radio connection.

The method according to the invention is applicable for controlling the transmission power in a data transmission system comprising a first device and a second device and a two-way data transmission connection in between, wherein the first device sends to the second device user data and the second device sends to the first device user data and control information. It is characterised in that it comprises the steps of determining a first transmission power level, a second transmission power level and a third transmission power level and transmitting from a second device to a first device a frame of data by applying said first transmission power level to the transmission of a user data field, said second transmission power level to the transmission of a first control information field and said third transmission power level to the transmission of a second control information field.

The invention also relates to a mobile station and base station in a cellular radio system, said stations being characterised in that they are provided to function as the first or second device in the method described above.

According to the invention, the reliability of the control information in the reception can be adjusted by sending the bits belonging to a given control field at a higher or lower power than the bits belonging to some other field of the same frame. When an optimal transmission power is found for the control field bits, the reliability of the control information in the reception has reached the desired level, and the total interference in the system remains as low as possible. Naturally an increase in the transmission power improves reliability in the reception, and respectively a decrease in the transmission power weakens reliability.

The transmission power of the control field bits is most advantageously chosen according to how reliable the receiving device interprets them to be, or how much quality-weakening interference there is assumed to occur in the radio connection. On the other hand, the transmission power of the different parts of the control information can also be adjusted depending on the measured connection quality in between the receiving and transmitting device, in the same or in the opposite transmission direction. For instance, the transmission power of the power control commands related to a downlink connection can be changed with respect to the transmission power of the rest of the bits contained in the same frame, if the quality of the uplink connection is unnecessarily good or too bad. In similar fashion, the transmission power of the power control commands related to a downlink connection with respect to the transmission power of the rest of the bits contained in the same frame can be reduced, if the quality of the uplink connection conforms strictly to the target level. In that case, the connection quality is typically described with a SIR value.

The increasing of the transmission power of the above mentioned RI bits with respect to the transmission power of the rest of the bits contained in the same frame improves the reliability of the RI bit interpretation performed by the receiver, in which case the receiver can, with a higher probability, handle the data bits belonging to the frame correctly. The power difference between the pilot bits and the data bits can be adjusted on the basis of how good is the value of the quantity describing the connection quality to which the pilot bits are in average connected during a given measurement period. The increase of the pilot bit transmission power aims mainly at improving the reliability of the channel estimate (and the SIR estimate).

The controlling of the transmission power separately for each control field improves the efficiency in the utilisation of radio resources, because an unnecessarily high power is not used for transmitting such control commands and other control information that can be received to a sufficiently reliable degree even when transmitted at a lower power.

BRIEF DESCRIPTION OF THE DRAWINGS

The invention is explained in more detail below, with reference to a few preferred embodiments described by way of example, and to the appended drawings, where.

DETAILED DESCRIPTION OF THE INVENTION

Particularly advantageously the invention can be applied in the future UMTS (Universal Mobile Telecommunications System), and therefore we shall below briefly explain how the inner power control loop is realised in UMTS. The invention is, however, not restricted to UMTS applications, but it can be used in all cellular radio systems where power control commands and/or similar control channel information is transmitted and received in between a mobile station and a base station. As an example of such a system, let us point out the IS-95 mobile phone system, where the power control commands are punctured at pseudo random in the data. In that case, in the method according to the invention, the ratio of the control bit transmission power and the data transmission power is adjusted according to how reliably the control information should be received. A higher reliability is achieved by increasing the ratio of the control bit transmission power to the data transmission power.

Figure 1:
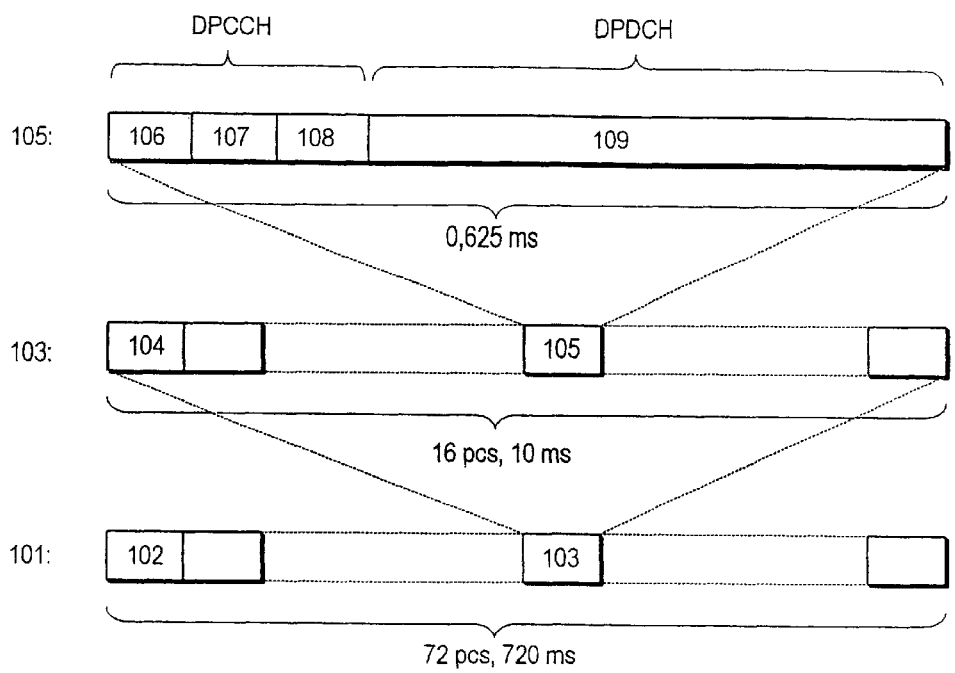
FIG. 1 illustrates a frame structure in a downlink connection.

FIG. 1 illustrates a superframe 101 in a downlink connection, said superframe comprising 72 successive frames 102. There is illustrated in more detail how the j'th frame 103 is divided into 16 time slots 104, as well as how the i'th time slot 105 is divided into a pilot field 106, a power control field 107, an RI (Rate Indication) field 108 and to a data field 109. From the point of view of the invention, the lengths of the separate fields are not significant, although an advantageous number of bits in the power control field 107 fluctuates in a way to be explained below. According to the standard proposal, the length of the whole time slot 105 is 0.625 ms and it contains $20*2^k$ bits, where the parameter k∈[0, 6] is associated with the employed spreading factor. The fields 106, 107 and 108 together constitute a DPCCH (Dedicated Physical Control Channel) for the downlink connection, and the data field 109 constitutes a DPDCH (Dedicated Physical Data Channel) for the downlink connection. In the case of FIG. 1, the invention is particularly related to controlling the transmission power of the bits contained in the pilot field 106, the power control field 107 and the RI field 108. A corresponding pilot field, power control field and RI field is contained in every time slot of every frame of the superframe, but the invention does not require that all bits of all pilot fields, power control fields and RI fields should be used in the same fashion.

Figure 2:
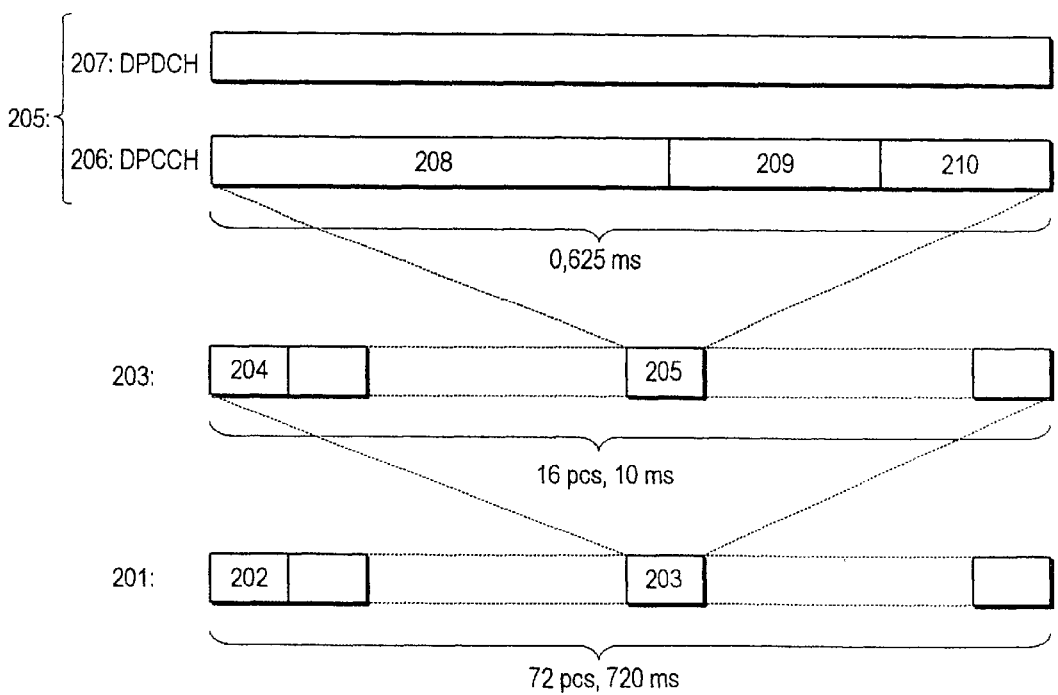
FIG. 2 illustrates a frame structure in an uplink connection.
Figure 3A:
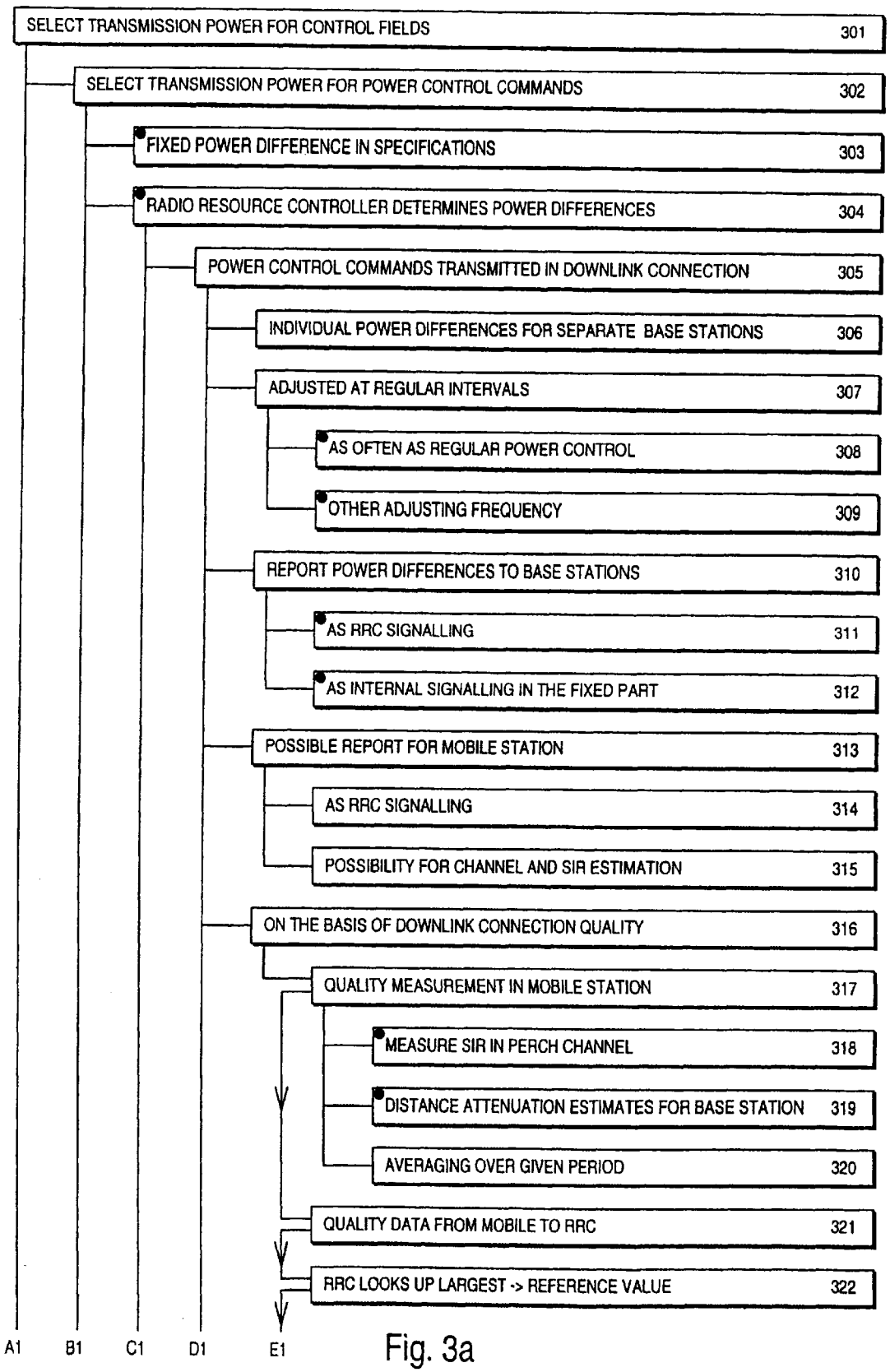
FIG. 3 illustrates a number of functional alternatives of the method according to the invention.
Figure 3B:
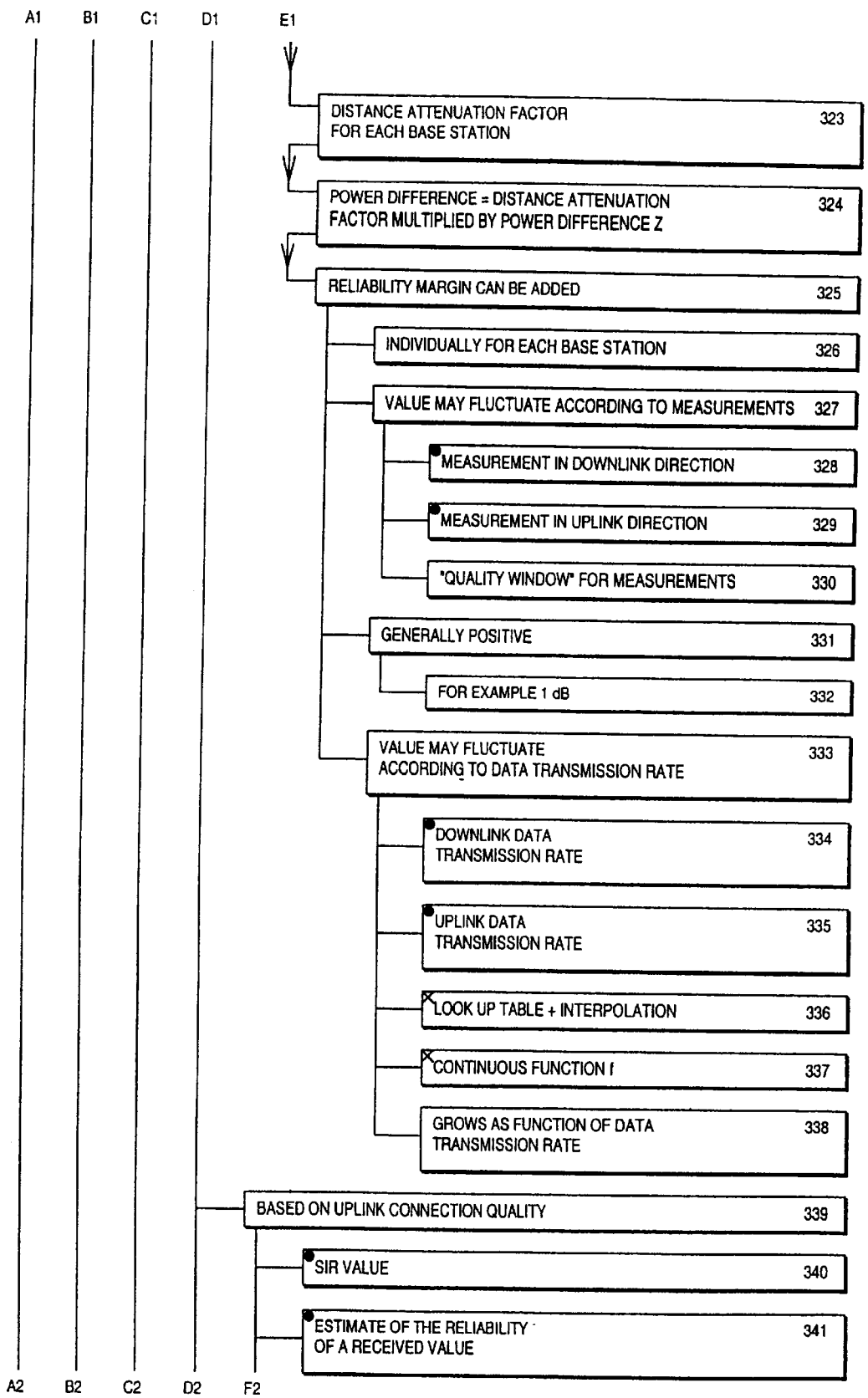
Figure 3C:
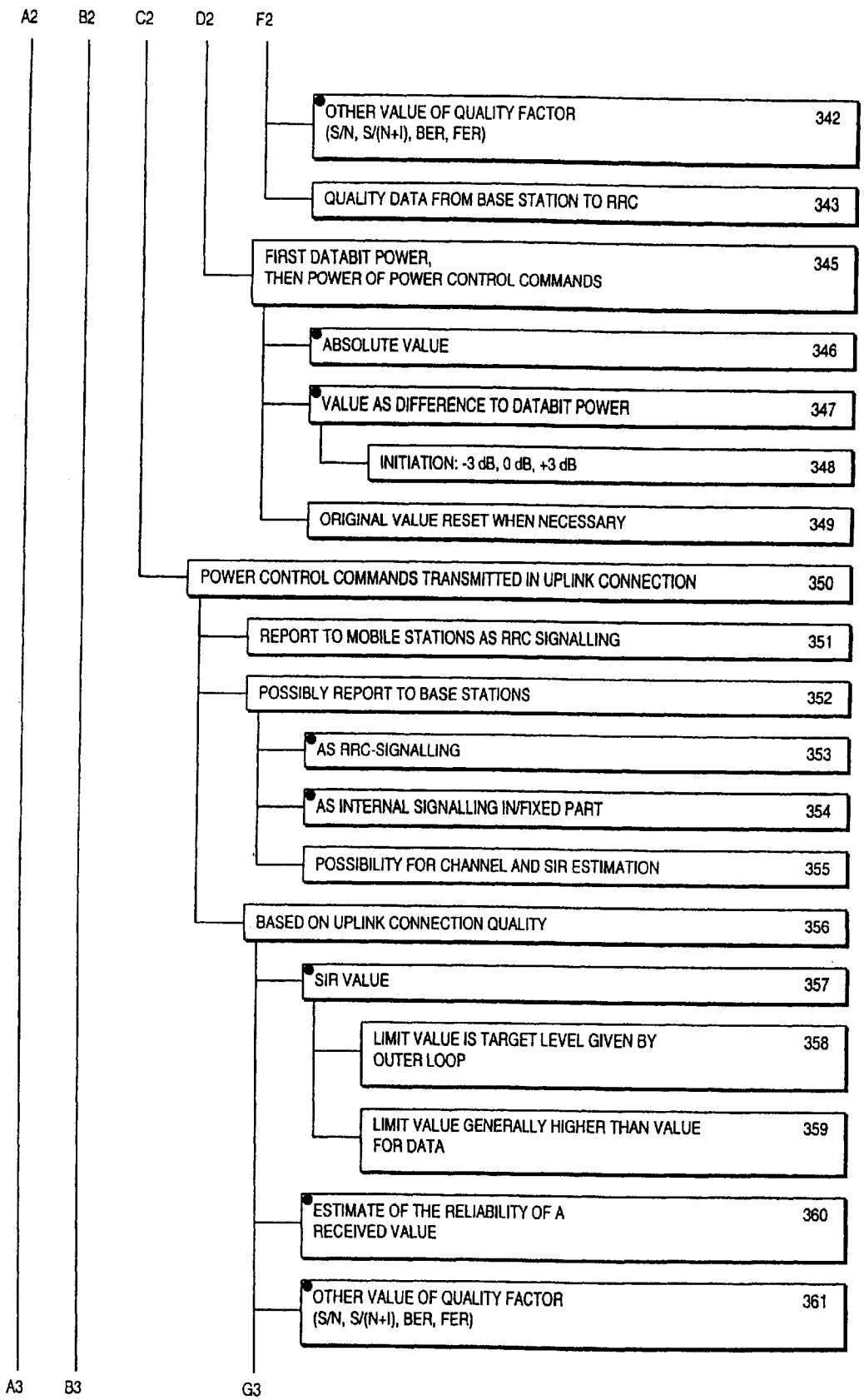
Figure 3D:
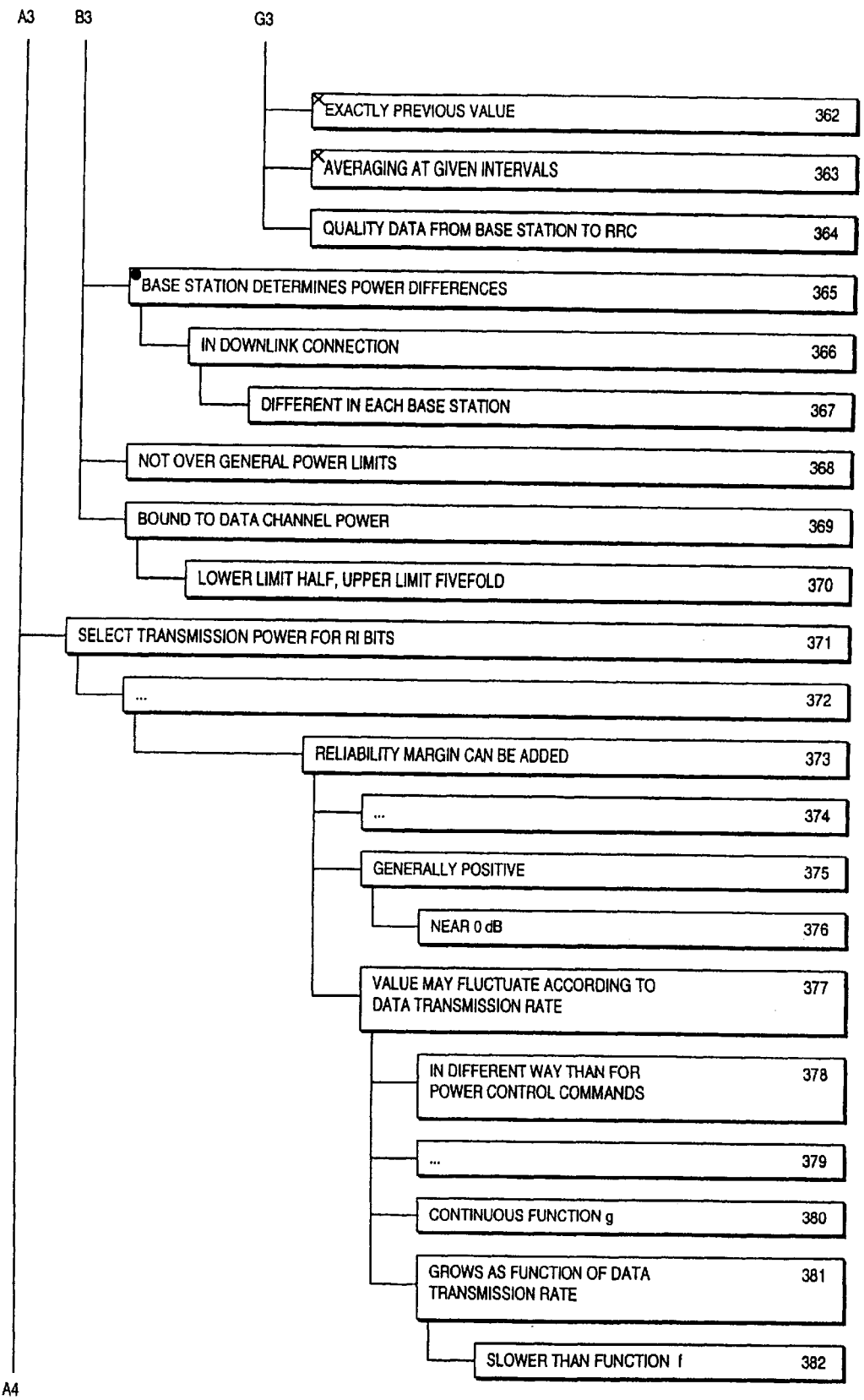
Figure 3E:
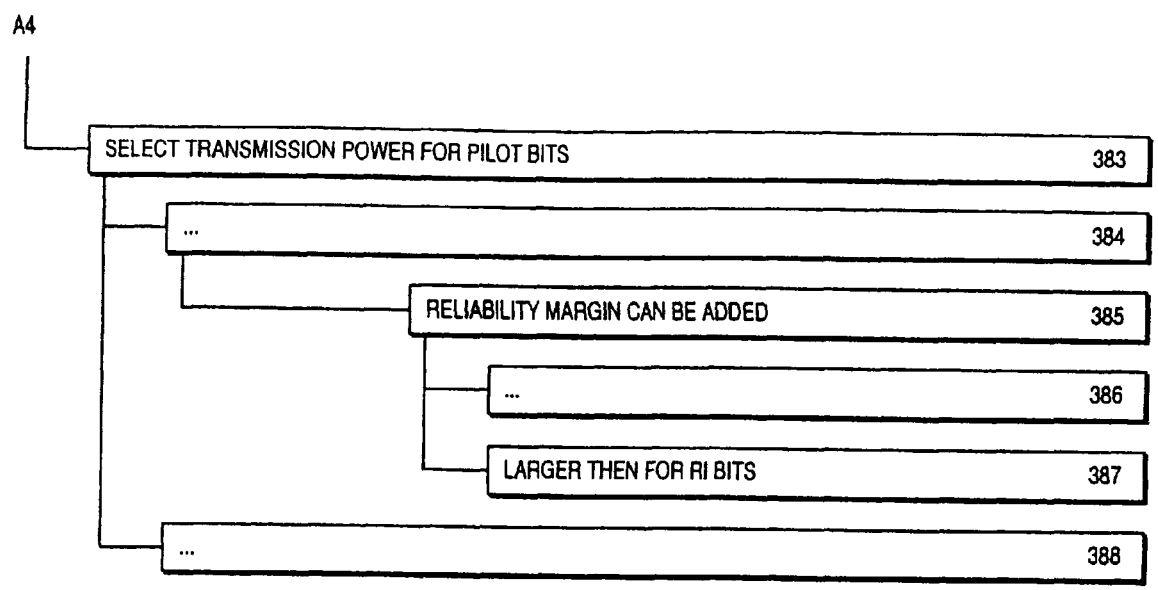

FIG. 2 illustrates a corresponding arrangement in an uplink connection. Even here, the length of the superframe 201 is 720 ms, and it contains 72 successive frames 202. Among the time slots 204 contained in the j'th frame 203 represented in more detail, there is particularly illustrated the i'th time slot 205, during which the DPCCH part 206 and the DPDCH part 207 are transmitted simultaneously and in parallel. Said parts are separated from each other by code division, i.e. in transmitting the DPCCH part 206, a different spreading code is used than in transmitting the DPDCH part 207. The former part contains the pilot field 208, the power control field 209 and the RI field 210. The invention is particularly related to the use of the bits contained in the pilot field 208, the power control field 209 and the RI field 210. In similar fashion as in the case of the downlink connection, a corresponding pilot field, power control field and RI field is contained in every time slot of every frame of the superframe, but the invention does not require that all bits of all pilot fields, power control fields and RI fields should be used in the same way.

In between a data channel and a control channel, there can prevail a power difference of a constant magnitude, by which the effect of the different spreading factors to the ratio of the received symbol energies is compensated.

In general, in an uplink connection the transmission power of the control channel (in the UMTS application the DPCCH channel) is lower than that of the data channel (the DPDCH channel), because in an uplink connection the control channel spreading factor is generally higher than that of the data channel. In UMTS the chip rate is 4.096 Mchip/s, and if we observe for instance a situation where the bitrate of the uplink DPCCH channel is 16 kbit/s, and the bitrate of he DPDCH channel is 32 kbit/s, and the received ratio of channel symbol energies should be maintained the same, the data channel must transmit at a double transmission power in comparison to the control channel, because its spreading factor (128) is half of the spreading factor (256) of the control channel.

In general, in an uplink connection the ratio of the channel symbol energies (ratio of the spreading factors) of the DPCCH channel and the DPDCH channel received by the base station is higher than the ratio of the transmission power of the DPCCH channel and of the DPDCH channel respectively, when the bitrate of the DPDCH channel is over 32 kbit/s. In that case the transmission power of the bits in the DPCCH channel of the uplink connection, divided by the number of the bits (or by the bitrate), is higher than the transmission power of the DPDCH channel divided by the number of the bits (or by the bitrate), in which case the control information bits (the bits of the DPCCH channel) are received at a higher energy than the data bits.

According to the invention, the power differences are not restricted only to the different channels, but also inside the channel, in the separate fields—represented by fields 106, 107, 108, 208, 209 and 210 in FIGS. 1 and 2—the transmission power of the bits to be transmitted can have different values, and transmission power can be adjusted from time to time, or even during a given connection.

According to a preferred embodiment of the invention, the desired ratio of the channel symbol energies of the DPCCH channel and the DPDCH channel within the uplink connection can be adjusted on the basis of the quality of the uplink or downlink connection. Said quality is described by some measured or estimated characteristic, for example the SIR value. When speaking of increasing or reducing the transmission power difference in between the control channel (or a part thereof) and the data channel, it is necessary to take into account the possible original value of said power, which value is then adjusted.

The invention encompasses a large number of functional and implementational alternatives. The mutual relations of said alternatives are illustrated in FIG. 3, which is divided into five subfigures 3a, 3b, 3c, 3d and 3e. In the general picture formed by said subfigures, the subfigures are organised one below the other so that the topmost is subfigure 3a, and the lowest is subfigure 3e. The functional alternatives illustrated in the drawing are placed in a hierarchical order, i.e. under a given higher-level function, there is located a given number of functions of the next highest level, part of which can be mutually alternative. The alternative nature between given lower-level functions immediately associated with one and the same higher-level function is marked with a dot or a cross in the upper left corner of the block representing said function. As an example, let us observe the function 333 illustrated in the subfigure 3b, under which there are located the lower-level functions 334, 335, 336, 337 and 338. Among these, the functions 334 and 335 are mutually alternative (dot), and the functions 336 and 337 are mutually alternative (cross). The lines describing the hierarchical order of the functions continue from one subfigure to another, and at the seams in between the sub-figures, said lines are provided with code letters and numbers. For instance, the downwardly directed line A1 located at the left edge of the subfigure 3a continues at the top edge of the subfigure 3b, at point A1. The functions 317, 321, 322, 323, 324 and 325 are parts of a wider function, to be executed in this order, which is illustrated by the arrows drawn between said functions.

Block 301 represents the idea behind the invention, according to which the transmission power of the control fields can be chosen to be mutually different, and also different from the transmission power of the data field. Because in FIG. 3 we observe particularly how the invention is applied in the UMTS system, where the location of the control fields and the data fields in the frames corresponds to FIGS. 1 and 2, and the selection of the transmission power of the power control commands 302, the selection of the RI bit transmission power 371 and the selection of the pilot bit transmission power 383 are placed under the block 301. Let us now observe the selection of the transmission power for the power control commands.

In order to select the transmission power of a given field according to the method of the invention, there are three alternative ways. The first alternative 303 is that the power difference in the transmission power between a given field (while under the heading in block 302: the power control field) and the data field is permanently defined in the system specifications. This is not the best possible way to adapt the system to changing conditions, although it is advantageous in terms of minimum complexity. The second alternative 304 is that a radio network controller, RNC, decides the power difference that is applied in each case between the transmission power of a given (power) control field and of the data field. The term "radio network controller" refers in general to a device included in the fixed parts of the network, said device controlling the use of radio resources in a base station subsystem containing several base stations, or in some other part of a cellular radio system. The third alternative 365 is that each base station independently determines the transmission power differences in the separate fields. It is advantageous to centralise the decision-making process into the radio network controller, according to the alternative 304, particularly from the point of view of macrodiversity connections, as compared to base station centered decision-making 365, because in the former case, there is no need for specific mechanisms in order to transmit power control information between base stations.

Under alternative 304, let us separately observe power control commands to be transmitted in the downlink direction 305 and power control commands to be transmitted in the uplink direction 350. In the downlink case, according to block 306, it is advantageous that the base stations participating in a macrodiversity connection can apply a different power difference in the transmission power between the power control commands and the data field. The power differences can, according to block 307, be adjusted at regular intervals, for instance as often as the actual power control (according to the inner loop) is performed in the connection 308, or with some other control frequency 309— the invention does not restrict how often the power should be adjusted. Regularity here does not mean a rigid regularity, but the power control frequency of the power control commands can be flexible, for example according to how large a part of the system capacity can be allocated for this purpose.

The expression of the power to be employed in the transmission of the power control commands is, for the sake of simplicity, called the expression of power difference, because one very advantageous practice is to express just the transmission power difference between the power control commands and the data, and not any absolute transmission power value of the power control commands. The radio network controller must then indicate the power differences to be employed in the transmission of the power control commands in the downlink connection to the base stations according to block 310. This can be carried out as radio network controller signalling (RNC signalling) 311, or as part of internal signalling between the fixed parts of the network 312. Information of all or some power differences can also be transmitted to the mobile station according to block 313, most advantageously by using RNC signalling 314. For example, only the power difference between the pilot bit field and the data bits from each base station forming a macrodiversity connection can be signalled to the mobile station, in which case the information as regards the power differences between the rest of the control information and the data is left unsignalled to the mobile station. When the mobile station knows the transmission power readings of the power control commands at the different base stations, it can use the received power control commands for channel estimation and for the estimation of the SIR value according to block 315. The basis for defining the downlink power differences can be the quality of the downlink connection 316 and/or the quality of the uplink connection 339. In the former case, the connection quality is measured by the mobile station according to block 317, by applying either the measurement of the SIR value of the known Perch channel 318, or the distance attenuation estimates of the base stations 319, if these are available. The mobile station can average the measurements over a given period of time, according to block 320; an alternative would be the transmission of each measured value promptly to the radio network controller via the base station, but this would take a remarkable amount of radio resources between the mobile station and the base station. In the averaging 320, weighting can be applied, where the latest values are weighted most.

From the quality measurement 317, there begins a chain of actions, an exemplary realisation of said chain being illustrated in FIG. 3. According to block 321, the mobile station signals the averaged SIR values (or distance attenuation estimates) to the radio network controller, which finds the highest among the signalled values and sets it as a reference value according to block 322. Thereafter, a quantity called the distance attenuation factor is calculated for each macrodiversity connection base station, according to block 323. It is an averaged SIR value of the Perch channel of the downlink connection of said base station, or a corresponding quantity divided or multiplied by the reference value. By means of the distance attenuation factor, the power differences proper for each base station are calculated according to block 324.

As an example, let us assume that a macrodiversity connection includes n base stations, where $n \geq 1$, and the absolute SIR values of the Perch channel (not in decibels), associated with their downlink connections and measured by the mobile station, are for the base station number one $x_1$, for the base station two $x_2$ and in general for a base station $k \leq n$ $x_k$. Let us further assume that the highest among said values is the value $x_1$ associated with the base station number one. Now the power difference set for the base station one is $(x_1/x_1)*z$, the power difference set for the base station two is $(x_1/x_2)*z$ and in general the power difference set for a base station $k \leq n$ is $(x_1/x_k)*z$. In these power difference calculation formulas, z is a desired power difference of the power control commands and the data bits in a case where the mobile station is in a macrodiversity connection with n base stations, so that the SIR values of the Perch channel in the downlink connection of said base stations, or the average distance attenuation factors calculated on the basis thereof, are equal. Now (according to the calculation formulas), in decibels the transmission power of the power control commands of a base station $k \leq n$ is $10*\log10((x_1/x_k)*z)$dB higher than the transmission power of the data channel. The power difference calculated in this fashion can here be called the distance attenuation based power difference. The power difference of the base station one, which has the highest SIR value of a downlink connection, is $10*\log10((x_1/x_1)*z)$dB, where the value of z can be chosen to be for instance n, when the mobile station is in a macrodiversity connection with n base stations.

Thus it is advantageous to first choose the parameter z to be for example the same as the number of such base stations that are involved in the macrodiversity connection between the mobile station and the network. The task of the parameter z is to improve the reliability of the power control commands, which is achieved by increasing the value of the parameter z. For example, if there are three base stations, the value chosen for z can at first be three, but when necessary, the value of the parameter z can be adjusted, so that its value is increased, if the reliability of the power control commands is not sufficiently good, and its value is reduced, if the reliability of the power control commands (for instance the SIR value of the power control commands) is unnecessarily good.

In blocks 322–324, the power differences are defined essentially from the measured SIR values of the Perch channel of the downlink connection, or from other corresponding quantities. In addition, in the power differences there can also be added an individual reliability margin for each base station 326, or the same reliability margin for all base stations of the macrodiversity connection, according to the procedure represented in block 325. This kind of base-stationwise reliability margin can be used for controlling the transmission power of the power control commands sent by all base stations involved in the macrodiversity connection and for thereby affecting the reliability of the power control commands. In general, an increase in the reliability margin improves the reliability of the power control commands received by the mobile station, and a reduction in the reliability margin reduces reliability. Because the reliability margin can be different for different base stations, the reliability of the power control commands of a single base station can be improved on the basis of the measured quality of the data transfer as in block 327, the measurement being based on the downlink 328 and/or uplink 329 data, in said connection, for example so that if the quality (for example the SIR value of the power control commands or that of the data) has been sufficiently good, the reliability margin can be reduced, whereas in other cases the reliability margin is increased. If the reliability margin is to be adjusted on the basis of the average quality of an uplink connection experienced by the base station, it is advantageous to increase the reliability margin, if the quality (for example the SIR value) has been just barely sufficient or too poor, and in other cases it is advantageous to reduce the reliability margin.

The reliability margin can be used alone in order to determine the power differences of the power control bits and the data bits for each base station, without taking into account differences in the distance attenuation for the base stations and the parameter z, in which case the distance attenuation based power difference is 1 (0 dB).

Another alternative for adjusting the reliability margin and therethrough the power difference individually for each base station according to the quality of the uplink connection is based on a rule like the following: the reliability margin is increased, if the quality is sufficiently good (i.e. the value of the quality factor, for example the SIR value, surpasses a given upper limit), and the reliability margin is reduced, if the quality is too poor (i.e. the value of the quality factor falls below a given lower limit, which is smaller or equal to the upper limit value), and the reliability margin is left unchanged, if the quality of the uplink connection is not too good nor too bad (i.e. the value of the quality factor remains in between the upper and the lower limit, i.e. in the so-called quality window 330). In general it is profitable to choose a positive reliability margin 331 (for instance 1 dB; 332), in which case the mobile station receives the power control commands of said base station more reliably than in a situation where the reliability margin is not used.

Moreover, the value of the reliability margins can be adjusted on the basis of the data transmission rate (bitrate) 333, so that a function or a look-up table is created, which function or table maps the employed data transmission rate as a value of the reliability margin. In that case the transmission rate of the data to be transmitted refers mainly to the data transmission rate in the same data transmission direction to which the power control commands are related, the commands whose transmission power difference is adjusted with respect to the data bit power. Hence, if the power difference of the power control commands transmitted in a downlink connection is adjusted with respect to the power of the data bits of the downlink connection, the value of the power difference (reliability margin) can be adjusted based on the data transmission rate of the uplink connection.

The invention does not restrict the controlling of the power difference on the basis of the data transmission rate of a given transmission direction, but the adjusting of the reliability margin associated with the power difference, or in general the adjusting of the whole power difference can be based on the data transmission rate of data transmitted in either direction 334, 335, irrespective of the direction in which the relative power of the power control commands (or other control information fields) with respect to data bit power is adjusted. Most advantageously the reliability margin is an increasing function of the data transmission rate 338: the value of the reliability margin increases when the data transmission rate increases, and decreases when the data transmission rate decreases. A practical solution is to present the function as a table, with the data transmission rate values in one column, and the reliability margin values in the adjacent column (a look-up table 336). Now the value of the reliability margin associated with the employed data transmission rate can be looked up. If the data transmission rate value in question is not found in the table, the nearest values are used for interpolating the reliability margin value or the nearest entry in the data transmission rate column is used for looking up the reliability margin value. Function f which determines the ratio of the data transmission rate and the reliability margin value can also be a continuous function 337. Thus the reliability margin value used in each base station in a macrodiversity connection can be affected by both the quality of the downlink (and/or uplink) connection and the employed data transmission rate.

Yet another possibility is to control the value of the parameter z, explained above, on the basis of the data transmission rate—in similar fashion as the controlling of the reliability margin according to the data transmission rate is described above. In that case the reliability margin is no more dependent on the data transmission rate.

Instead of the above described actions located below block 316, the controlling of the transmission power of the power control commands transmitted in the donwlink connection can be based on the quality of the uplink connection, according to block 339. From the point of view of this embodiment, the essential factor is the describing of the uplink connection quality by the SIR value 340 or by the value of some other corresponding quantity, which is measured after the transmission carried out in an uplink time slot. The SIR value or a corresponding quantity can in general be called a quality factor 342 in this context as well as in other contexts where this patent application describes the use of the SIR value. In addition to the SIR value, other possible quality factors are for instance S/N (Signal to Noise ratio), S/(N+I) (Signal to Noise and Interference ratio), BER (Bit Error Ratio) and FER (Frame Error Ratio). In addition to the quality factor, or instead of it, information about the reliability of the power control command received by the base station 341 can be used; as such, the investigation of the reliability of a received command or some other value is just a way to determine the quality of the connection. An estimate of the reliability of a received command is easily obtained for example by observing how the received form of said command is located on a value axis where the known values are those that exactly correspond to the correctly received values of said command. The evaluation of the reliability of a received command is explained in an earlier patent application, number FI-980809 by the same applicant, which is incorporated herein by reference.

According to the invention, the transmission power of the power control commands transmitted in the downlink connection and/or other data associated with the control channel (or the ratio of their transmission power to the transmission power of the data bits) may even be controlled separately in each base station belonging to the macrodiversity connection. In such a case it is most profitable to first adjust the transmission power of the data bits, and thereafter the transmission power of the power control commands and/or other data associated with the control channel 345, either as an absolute power value 346, in which case the transmission power of the power control command does not have to be dependent on the data bit transmission power, or by defining the power difference between the transmission power of the control commands and that of the data bits for instance as a decibel value 347. In the beginning, the power difference can be initialised 348 by setting it for example as 0 dB, +3 dB or −3 dB. A power difference 0 dB means that the transmission power values are identical, 3 dB means that the transmission power of the power control commands and/or other data associated with the control channel is double as compared to the transmission power of the data bits, in which case the bits that were transmitted at a higher rate are received more reliably, and the power difference −3 dB means that the transmission power of the control commands and/or other data associated with the control channel is half of the transmission power of the data bits. Thereafter the power difference can be continuously adjusted, or it can be reset 349 to the power difference target value desired by the radio network controller, by using radio resource control signalling at regular intervals.

Despite of the adjusting of the transmission power of the power control commands, the mobile station receives the power control commands transmitted in the downlink direction with a fluctuating reliability level, and in a macrodiversity connection from various base stations with different reliability levels. According to an advanced embodiment of the invention, it is possible to require that the command signifying a reduction in the transmission power must be sufficiently reliably received in the mobile station, in order to make the mobile station reduce its transmission power. Again the applied measure of reliability can be the above described location of the received form of the command on a given axis, where the known points are the correctly received values of said command. Another possible measure for the reliability is the SIR value or a corresponding characteristic describing the connection quality, so that if the SIR value estimated for the data bits or the power control bits, or a corresponding value, surpasses a given predetermined target level, the power control command is interpreted as reliable. In other cases the power control command is interpreted as unreliable.

The minimum reliability required of the power control commands in connection with one base station simply means that the mobile station does not obey such power control commands that it interprets as unreliable. In a macrodiversity connection it can be required that each power control command must be received with a given level of reliability, in order to be accepted as input information to the algorithm according to which the mobile station controls its transmission power. By way of example, let us assume that the mobile station is in a macrodiversity connection with two base stations. The first base station sends to the mobile station a command to increase its transmission power, and the mobile station receives said command with a reliability level better than the minimum level. The second base station sends to the mobile station a command to reduce transmission power, but this command the mobile station receives with a reliability level poorer than the minimum level. Now the mobile station increases its transmission power, because the command sent by the second base station and interpreted as unreliable is not fulfilled.

Let us now observe an advantageous embodiment of choosing the transmission power for the power control commands to be transmitted in the uplink direction. In FIG. 3, this observation is located under block 350. Let us further assume that the decisions of the power differences are carried out by the radio network controller, in which case it must transmit the information of the decision to the mobile station most advantageously as RNC signalling 351, and to the base stations 352 as RNC signalling 353, or as internal signalling of the fixed part of the network 354. When the base station knows the transmission power of the power control commands in the mobile station, it can use the received power control commands for channel estimation and for estimating the SIR value 355.

The employed value of the quality factor of the uplink connection (356), affecting the choice of the transmission power of the power control commands transmitted in the uplink connection, can be either an average value of a given period 363, or a value associated with exactly the previous time slot 362. If the quality factor is the SIR value of the control channel or that of the data channel 357, the employed limiting value of the quality factor in the transmission power control of the power control commands and/or other information associated with the control channel can, according to the invention, be the same as the value which is the common SIR value target level of the whole connection (given by the outer power control loop, i.e. the so-called quality loop) 358. Another possibility is to employ a value which is higher or lower, for the amount of a given margin, than the SIR target level of the connection, given by the quality loop. In general it is profitable to choose this reliability margin to be positive, i.e. to keep the limiting value describing the quality of the connection, applied in adjusting the transmission power of the power control commands related to the downlink connection and/or of other information associated with the control channel, higher 359 than the target level applied in the data transmission of the connection. The value of the quality factor is measured and signalled to the RNC by the base station 364.

In its cells, the base station can make independent decisions as for the transmission power of the power control commands according to block 365. Now inside the cell, on a smaller scale, essentially the same procedures are applied as were described above in relation to the base station subsystem, where the decisions were made by the radio network controller. In a downlink connection 366, the base station centred decision-making automatically leads to a situation where different transmission power values 367 are used in cells belonging to different base stations for sending power control commands.

Naturally the control information transmission power adjusted according to the invention, i.e. in UMTS the transmission power of the different fields of the DPCCH channel, must not surpass the limits of the general power control dynamics 368, i.e. they must not surpass the highest allowed transmission power nor fall below the lowest allowed transmission power. In addition to this, it is advantageous to restrict the transmission power of the control bits (bits of the DPCCH) so that the transmission power value of each field in the control channel is in one way or another linked to the transmission power value of the DPDCH channel 369 transmitted in the same time slot. For instance, the transmission power of the DPCCH channel fields can be restricted within an interval, where the lower limit is half of the transmission power of the DPDCH used in the same time slot, and the upper limit is five times the transmission power of the DPDCH used in the same time slot, 370. Other lower and upper limits can be found for example by experimenting.

Next we shall explain in more detail how the transmission power particularly in transmitting the RI bits is controlled according to an advantageous embodiment of the invention. In FIG. 3, this observation falls under block 371. In controlling the transmission power of the RI bits, the same principles can be applied as in controlling the transmission power of the power control commands, which is illustrated by the general blocks located under block 371 and marked with three dots. The general block 372 represents all blocks 303–324 associated with the adjusting of the transmission power of the power control commands, the general block 374 represents blocks 326–330 and the general block 379 represents both blocks 334–336 and blocks 339–370.

The transmission power of the RI bits can in the method according to the invention be different than the transmission power of the power control commands. Power difference between the RI bits and the power control bits in one of the macrodiversity connection base stations can, for instance, be due to the fact that the power of both the RI bits and the power control bits in relation to the power of the data bits is calculated in the same fashion, on the basis of the distance attenuation estimates of the base stations of the macrodiversity connection, or corresponding quantities and/or on the basis of the connection between the base station and the mobile station, except that the reliability margin 373 of the power difference between the RI bits and the data differs from the reliability margin of the power difference between the power control bits and the data. The reliability margins associated with the power difference between the RI bits and the data bits, as well as to the power difference between the power control bits and the data bits can for instance be in different ways dependent on the data transmission rate 377 of the data to be transmitted. Function f—in between the reliability margin (usually independent of the connection quality) to be added in the power difference between the power control commands and the data bits, and the data transmission rate—can be a different function from function g between the reliability margin to be added in the power difference between the RI bits and the data bits and the data transmission rate in block 380. In the same way as controlling the power difference between the power control commands and the data bits, also in controlling the power difference between the RI bits and the data bits, it is not necessary to observe the distance attenuation based power difference (i.e. neither the differences between the base station distance attenuation estimates or similar quantities, nor the value of the parameter z), but the power differences employed in the various base stations of a macrodiversity connection can be directly defined on the basis of the reliability margin, in which case the reliability margin as such can be called the power difference.

Generally the value of function f, a function between the data transmission rate and the reliability margin associated with the power difference between the power control commands and the data bits, is profitably chosen, for every value of the data transmission rate, to be at least equal or larger than the value of function g, a function between the data transmission rate and the reliability margin associated with the power difference between the RI bits and the data bits. This is due to the high reliability requirements of the power control commands and to the fact that it is often reasonable to keep the reliability margin associated with the power difference between the RI bits and the data bits fairly narrow, because if the data is not received well enough, the correctly received RI bits do not necessarily have any great value. This is presented by the reliability margin being near 0 dB in block 376. The value of function g, associated with low data transmission rates, can naturally be higher than the value of function f, but still it is advantageous to choose function f so that its growth rate at any point (at the data transmission rate value) is higher than that of function g, i.e. function g grows at a slower rate 382 than function f.

What was described in the above specification as regards controlling the power difference between the transmission power of the RI bits and the transmission power of the data bits, can almost fully be applied in controlling the power difference between the pilot bits and the data bits under block 383. This is represented by the general block 384 (corresponds to blocks 303–324), the general block 386 (corresponds to blocks 326–338) and the general block 388 (corresponds to blocks 339–370). The only difference illustrated in FIG. 3 is that the value of the reliability margin associated with the power difference between the pilot bits and the data bits is generally advantageously chosen to be higher than the value of the reliability margin associated with the power difference between the RI bits and the data bits according to block 387. On the other hand, nothing in the invention prevents the power difference between the transmission power of the RI bits and that of the data bits from being larger than the power difference between the transmission power of the pilot bits and that of the data bits. The reliability margin of the transmission power of the pilot bits can be adjusted according to the same principles as the reliability margin of the transmission power of the RI bits, and the reliability margin of the transmission power of the power control commands, but all of these reliability margins can be different in size. In cellular radio systems, the requirement of reliability in receiving the pilot bits correctly is high, and therefore it is generally advantageous to send the pilot bits (at least in the downlink connection, where the control information, to which also the pilot bits belong, and the data bits are separated in time) at a higher power than the data bits of the same power control slot, in which case the reliability and accuracy of the channel estimation are improved.

Figure 4:
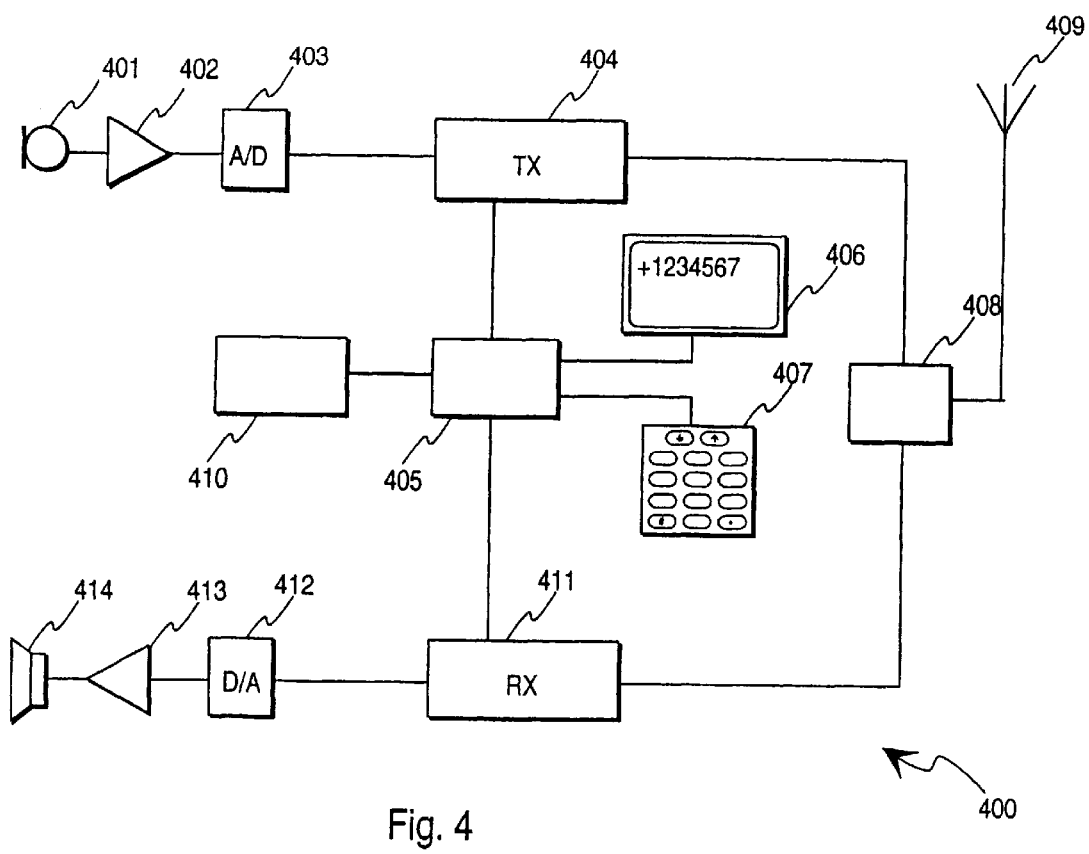
FIG. 4 illustrates a mobile station according to the invention.

FIG. 4 is a schematic illustration of a mobile station 400 in a cellular radio system, said mobile station comprising in the transmitting branch a microphone 401, an amplifier 402, an A/D converter 403 and a transmitter 404, as well as in the receiving branch a receiver 411, a D/A converter 412, an amplifier 413 and a loudspeaker 414. The passage of the signal between the transmitting and the receiving branch as well as the antenna 409 is controlled by a duplexing block 408. Most advantageously the control block 405 is realised by a microprocessor, from which connections are provided to the display 406 and the keyboard 407, as well as to the memory 410, where the program run by the microprocessor 405 is stored and which is used as a data storage during operations. In order to apply the invention to a mobile station illustrated in FIG. 4, the transmitter block 404 must be provided so that when a bitflow representing the user's speech, produced by the A/D converter 403, and control information flows produced by the control block 405 are fed in said transmitter block, the transmitter block can apply different transmission power values for transmitting the bitflow representing the user's speech and the desired parts of the control information flow. In order to use the invention in practice, the control block 405 and the receiver block 411 must also be provided so that notice can be sent to the control block as to the guidelines of the transmission power, contained in the received radio resource control signalling, and that on the basis of said information, the control block can control the transmission power of the power control commands applied in the transmitter block 404.

Figure 5:
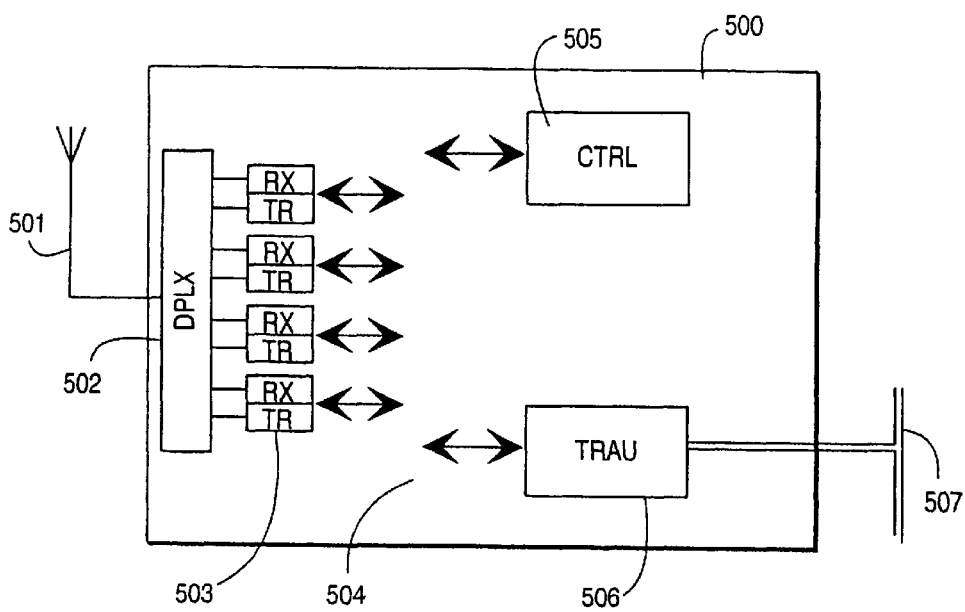
FIG. 5 illustrates a base station according to the invention.

FIG. 5 is a schematic illustration of a base station 500 comprising an antenna 501 and transmitter/receiver units 503 connected thereto by intermediation of a duplexing block 502, through which unit 503 there is further provided, via the path 504, connection to the control block 505 and to the transmission unit 506; by intermediation of said unit 506, the base station 500 is connected to the transmission system 507, connecting base stations of the base station subsystem and the base station controller/radio network controller. In order to apply the invention to a base station according to FIG. 5, the transmitter blocks in the transmitter/receiver unit 503 must be provided so that when the data to be transmitted enters the transmitter block through the path 504 from the transmission unit 506, and the information associated with the control channels as well as the information associated with the transmission power values applied in the transmitter block enter the transmitter block through the path 504 from the control block 505, the transmitter block can apply the desired power level in transmitting the bits of the data to be transmitted and those of the information associated with the desired parts of the control channels. In order to employ the invention, the control block 505, the transmission unit 506 and the receiver block of the transmitter/receiver units 503 must also be provided so that via the path 504, information of the guidelines regarding the transmission power contained in the radio resource control signalling received from the transmission system can be sent to the control block, and that the control block can, on the basis of said information, vary the transmission power of the power control commands applied in the transmitter block of the transmitter/receiver units 503, as well as the transmission power of other control information.

Figure 6:
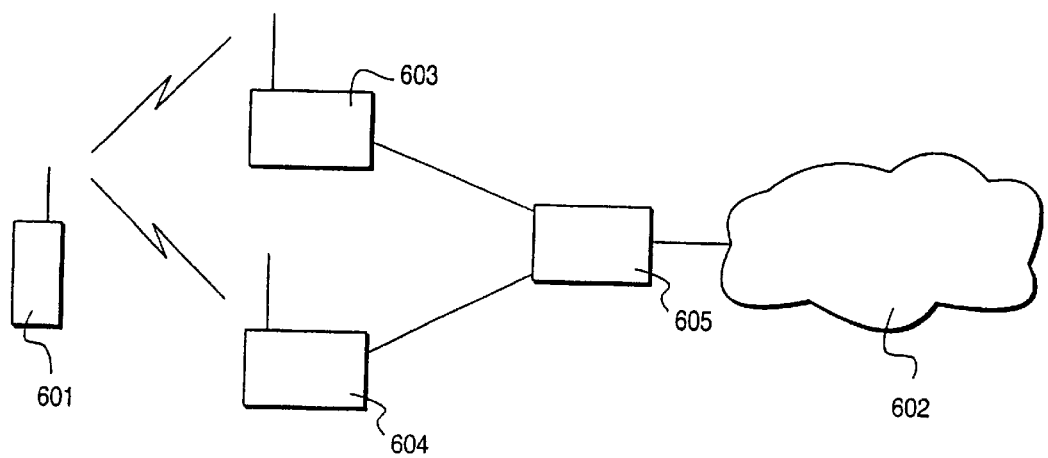
FIG. 6 illustrates a part of a cellular radio system, where the invention can be applied.
Figure 6:

FIG. 6 illustrates a part 600 in a cellular radio system, wherein the macrodiversity connection in between the mobile station 601 and the network 602 passes via the base stations 603 and 604 as well as via the radio network controller 605. Here we assume that the radio network controller 605 also serves as the base station controller; it is also possible to place the radio network controller in connection with a mobile switching centre or some other fixed arrangement of the network. In a preferred embodiment of the invention which is particularly suitable to be applied in this system, the radio network controller 605 hands out the guidelines of the power control according to the invention to the base stations 603 and 604, and through them, to the mobile station 601 by employing radio resource control signalling. In that case, in addition to what was said above, the radio network controller 605 must be provided for making and expressing such power control related decisions which were explained above, in connection with the various preferred embodiments of the invention.

What is claimed is:

1. A method for controlling transmission power in a data transmission system comprising a first device and a second device and in between them a two-way data transmission connection that employs Code Division Multiple Access, where the first device transmits to the second device user data on a data channel, and the second device transmits to the first device user data on a data channel and control information on a control channel, and a transmission arranged in a time slot comprises a user data field corresponding to a data channel and at least a first and a second control information field corresponding together to the control channel, said method comprising the steps of:

determining a first transmission power level, a second transmission power level and a third transmission power level; and transmitting from the second device to the first device during a time slot by applying said first transmission power level to the transmission of the user data field, said second transmission power level to the transmission of the first control information field and said third transmission power level to the transmission of the second control information field, and also applying a first spreading code to the transmission of the user data field and a second spreading code, different than said first spreading code, to the transmission of at least one of the first control information field and the second control information field.

2. A method according to claim 1, wherein said second and third transmission power levels are equal and different from said first transmission power level, corresponding to the transmission of the data channel with one transmission power level and the control channel with another transmission power level.

3. A method according to claim 1, wherein said second and third transmission power levels are unequal, corresponding to the transmission of at least two control information fields of the data channel with mutually different transmission power levels.

4. A method according to claim 1, additionally comprising the steps of sensing a quality factor of the connection between the first device and the second device and adjusting at least one of said second and third transmission power levels in relation to said first transmission power level, on the basis of the sensed quality factor between the first and second device.

5. A method according to claim 4, wherein the step of adjusting at least one of said second and third transmission power levels comprises the substeps of adjusting said second transmission power level in a certain way and adjusting said third transmission power level in a different way on the basis of the same sensed quality factor.

6. A method according to claim 4, wherein, in a data transmission system comprising mobile stations as well as a number of base stations and a radio network controller controlling the operation thereof, it comprises the steps of sensing a quality factor of a connection between a mobile station and a base station, conveying a value representing the sensed quality factor to the radio network controller, deciding in the radio network controller the adjustments to at least one of the second and third transmission power levels on the basis of said conveyed value, conveying to at least one of said base station and said mobile station power control information representing the decided adjustments to the transmission power levels and implementing in at least one of said base station and said mobile station the decided adjustments to the transmission power levels on the basis of said conveyed power control information.

7. A method according to claim 6, wherein during a given connection between said base station and said mobile station, the quality factor is sensed repeatedly, and that the radio network controller makes a new decision as regards the transmission power levels as a response to each occasion of sensing the quality factor.

8. A method according to claim 6, wherein at least one of the adjusted transmission power levels used by the base station is reported to the mobile station.

9. A method according to claim 6, wherein the radio network controller makes a decision as regards at least one of the second and third transmission power levels to be used by the base station on the basis of the sensed quality of a downlink connection between the base station and the mobile station.

10. A method according to claim 9, comprising the steps of sensing at the mobile station the quality of the downlink connection between the base station and the mobile station, reporting by the mobile station the sensed quality of the downlink connection to the radio network controller, calculating at the radio network controller the initial adjusted transmission power levels to be used by said base station, adding at the radio network controller a reliability margin to the initial adjusted transmission power levels to obtain final adjusted transmission power levels and signalling the final adjusted transmission power levels to the base station.

11. A method according to claim 9, where additionally a macrodiversity connection is applied, where among the base stations controlled by the radio network controller there are a first and second base station, which are simultaneously in a data transmission connection with one and the same mobile station, said method comprising the steps of sensing at the mobile station the quality of the downlink connection between the first base station and the mobile station and between the second base station and the mobile station, reporting by the mobile station the sensed qualities of the downlink connections to the radio network controller, selecting at the radio network controller the reported quality describing the better of the reported connection qualities as a reference value, calculating at the radio network controller a distance attenuation factor for each base station by calculating the ratio between the reported quality regarding that base station and said reference value, separately calculating at the radio network controller for each base station the relation of at least one of the second and third transmission power levels used by that base station to the first transmission power level used by that base station by multiplying said distance attenuation factor by a ratio of the unadjusted second or third transmission power level respectively and the first transmission power level, adding at the radio network controller to the calculated second or third transmission power level for each base station a reliability margin and signalling the so obtained final adjusted transmission power levels to the base stations.

12. A method according to claim 11, wherein the size of said reliability margin is separately determined for each base station.

13. A method according to claim 11, wherein the size of said reliability margin is selected on the basis of a data transmission rate applied in the connection in question.

14. A method according to claim 13, wherein the size of said reliability margin is an increasing function of the data transmission rate.

15. A method according to claim 6, wherein the radio network controller makes a decision as regards at least one of the second and third transmission power levels used by the base station on the basis of the sensed quality of an uplink connection between the base station and a mobile station.

16. A method according to claim 6, wherein the radio network controller first makes a decision of the first transmission power level to be used by the base station, and thereafter a decision of at least one of the second and third transmission power levels used by said base station in relation to the decided first transmission power level used by said base station.

17. A method according to claim 6, wherein the radio network controller makes a decision as regards at least one of the second and third transmission power levels to be used by the mobile station on the basis of the sensed quality of a uplink connection between the base station and the mobile station.

18. A method according to claim 4, wherein the sensed quality factor is one of the following: SIR, S/N, S/(N+I), BER, FER, or an estimate of the reliability of a received value.

19. A method according to claim 1, wherein in a macrodiversity connection, where the first device is simultaneously in the data transmission connection with a primary second device and a secondary second device, the method comprises the steps of:

determining said first, second and third transmission power levels separately for said primary and said secondary second devices, and transmitting from the primary second device to the first device during a time slot by applying the first, the second and the third transmission power levels determined for the primary second device, and from the secondary second device to the first device during a time slot by applying the first, the second and the third transmission power levels determined for the secondary second device.

20. A method according to claim 1, wherein the determination of the first, second and third transmission power levels is restricted so that each of them is always at least as high as a smallest allowed transmission power level predefined in the data transmission system, and at most as high as a highest allowed transmission power level predefined in the data transmission system.

21. A method according to claim 1, wherein the determination of the second and third transmission power levels is additionally restricted so that each of them is always at least as high as the first transmission power level multiplied by a given first factor, and at most as high as the first transmission power level multiplied by a given second factor.

22. A method according to claim 1, wherein the data transmission system comprises mobile stations and base stations so that first device is a mobile station and the second device is a base station, and the control information comprises power control commands sent by the base station to the mobile station, said method comprising the steps of estimating at the mobile station the reliability of at least a majority of the power control commands received from the base station, and when adjusting its own transmission power, observing at the mobile station only such power control commands, whose estimated reliability in reception surpasses a predetermined minimum reliability.

23. A method according to claim 22, wherein the mobile station estimates the reliability of the received power control commands by estimating the SIR value in the reception, in which case said predetermined minimum reliability corresponds to a predetermined SIR value.

24. An improved cellular radio system mobile station, comprising means for sending data to be transmitted and control data to a base station, and means for receiving data to be transmitted and control data from the base station, wherein the improvement lies in that it is provided to serve as the first or second device in the method described above in claim 1.

25. An improved cellular radio system base station, comprising means for sending data to be transmitted and control data to a mobile station and means or receiving data to be transmitted and control data from the mobile station, wherein the improvement lies in that it is provided to serve as the first or second device in the method described above in claim 1.

* * * * *